US006783310B2

(12) United States Patent
Kohlert et al.

(10) Patent No.: US 6,783,310 B2
(45) Date of Patent: Aug. 31, 2004

(54) SELF-CENTERING ELEMENT

(75) Inventors: Rudolf Kohlert, Stockstadt (DE); David Fischer, Aschaffenburg (DE)

(73) Assignee: A. Romheld GmbH & Co. KG, Laubach (DE)

( * ) Notice: Subject to any disclaimer, the term of this patent is extended or adjusted under 35 U.S.C. 154(b) by 63 days.

(21) Appl. No.: 10/323,014

(22) Filed: Dec. 18, 2002

(65) Prior Publication Data

US 2003/0118417 A1 Jun. 26, 2003

(30) Foreign Application Priority Data

Dec. 20, 2001 (DE) ........................................ 101 63 104

(51) Int. Cl.$^{7}$ ............................ B23B 31/10; B23D 7/08

(52) U.S. Cl. ........................ 409/225; 409/903; 279/4.1; 279/4.12; 279/121; 269/32; 269/34

(58) Field of Search ................................ 279/4.1, 4.12, 279/121; 269/32, 34; 409/225, 903

(56) References Cited

U.S. PATENT DOCUMENTS 4,747,609 A * 5/1988 Scharfen .................... 279/4.12
4,932,674 A * 6/1990 Pesch et al. ............... 279/4.02
5,060,958 A * 10/1991 Fischer et al. ............. 279/4.12
5,102,152 A * 4/1992 Grund et al. .............. 279/4.12
5,158,308 A * 10/1992 Fischer et al. .............. 279/121
5,160,151 A * 11/1992 Fischer et al. .............. 279/121

FOREIGN PATENT DOCUMENTS

EP 0 386 295 B1 9/1990
EP 1101554 A1 * 5/2001 ........... B23B/31/20

* cited by examiner

*Primary Examiner*—A. L. Wellington
*Assistant Examiner*—Dana Ross
(74) *Attorney, Agent, or Firm*—McGlew and Tuttle, P.C.

(57) ABSTRACT

A self-centering element for clamping workpieces via deflecting pins, which act between a drive element and self-centering slides. Deflecting pins, which are provided with grooves in which carrier prisms are arranged, are introduced in pairs into recesses in a housing in a plane located in parallel to the mounting surface of the element. The carrier prisms have wedge surfaces, which are slidingly guided in the grooves of the deflecting pins. The deflecting pins are controlled by pistons, which are arranged in the same plane but at right angles to the deflecting pins. The forces are transmitted beginning from the piston via the deflecting pins to the carrier prisms and then to the self-centering slides, which are connected to the carrier prisms and which move the clamping jaws.

9 Claims, 3 Drawing Sheets

Section A-A

Section B-B

Section C-C

SELF-CENTERING ELEMENT

FIELD OF THE INVENTION

The present invention pertains to a self-centering element for clamping workpieces between clamping jaws, which are associated with self-centering slides and are moved by means of deflecting pins arranged in pairs.

BACKGROUND OF THE INVENTION

Self-centering elements have the task of clamping workpieces in a centered manner. It is important in this connection that the clamping jaws that receive and hold the workpiece be guided accurately and move toward each other without a clearance. It is known that the clamping jaws can be moved by means of a toothed rack and a pinion, the consequence of which is that the retaining force is only as high as the clamping force itself Thus, all the forces acting on the workpiece during the machining adversely affect the holding action. The prior-art spindle drives with right-left threads have the drawback that they are not free from clearance. It Is important for the workpiece to be held securely and for its position not to be compromised by a machining force.

A device for a clamping unit has been known (EP 0 386 295 B1), in which deflecting pins are inserted in pairs for transmitting the driving forces, and these deflecting pins transmit the force in opposite directions via wedge surfaces and wedge bevels. Such a self-centering element is provided with a driving slide, which is guided longitudinally in the housing and is associated with a pair of deflecting pins each moving in opposite directions. The deflecting pins act in turn on self-centering slides via wedge bevels. This has the advantage that the frictional forces are very high and retaining forces that amount to a multiple of the clamping force are generated as a consequence of the double deflection of the movement by means of wedge bevels. However, the deflecting pins stand upright above the mounting surface of the element and thus determine the overall height, which in turn determines how far away from the machine table the clamped workpiece is mounted. Thus, the leverage of the clamping jaws above the machine table is added to the longitudinal and transverse forces, which may lead to twisting.

SUMMARY OF THE INVENTION

Thus, the object of the present invention is to design a clamping element such that it can make do with a smaller overall height by the force being introduced into the deflecting pins horizontally in a plane directly below the plane of the self-centering slides and by the wedge mechanism being arranged horizontally, i.e., in parallel to the mounting surface.

The advantage of such an arrangement is that workpieces can be moved as close to the mounting surface of the clamping element on the machine table as possible and the vibrations that are otherwise generated during the machining of the workpieces are thus very extensively eliminated. Moreover, this arrangement in one plane causes, due to the position of the deflecting pins and of the movements of all parts involved, which movements are associated therewith, that a very high retaining force will build up, so that the position and holding of workpieces once clamped cannot be affected by the machining forces any longer.

According to the invention, a self-centering unit for clamping workpieces between clamping jaws is provided.

The clamping jaws are associated with centering slides, with deflecting pins, which are arranged in pairs in a housing between a linkage and the self-centering slides and which bring about the transmission of forces from the linkage to the self- centering slides via wedge surfaces. Four recesses are provided in which two such deflecting pins, each cooperating in pairs, are slidingly guided. The four recesses are milled in the housing in a plane located in parallel to the mounting surface of the unit. The deflecting pins are provided with wedge bevels at the head end and slide on the wedge surfaces, which are associated with two pistons. The pistons are guided in the same plane in a cylindrical hole or region provided at right angles to the recesses. Displacement of the pairs of deflecting pins in opposite directions is brought about by the movement of the pistons. The self-centering slides are slidingly guided via carrier prisms in the deflecting pins and can be displaced at right angles to the direction of movement of the deflecting pins and are guided in a second plane located in parallel directly above the deflecting pins.

The deflecting pins may be provided over a partial area with a groove. Such a groove may have a straight limiting surface toward the end of the deflecting pin, and the groove may be limited by an oblique surface opposite this limiting surface.

One of the carrier prisms provided with two bevels can be inserted into each pair of deflecting pins such that the bevels are in contact with the oblique surfaces of the deflecting pins and are guided slidingly. The carrier prism may be connected to the self-centering slide.

The pistons may be actuated hydraulically via hydraulic connections. The movement of the pistons displaces the deflecting pins in pairs and in opposite directions via the wedge surfaces and the wedge bevel. The carrier prisms located in the grooves may be moved by the deflecting pins toward the outside away from one another or toward the inside toward one another as a consequence of the displacement of the deflecting pins in opposite directions, so that the self-centering slides connected to the carrier prisms bring about the clamping operation.

The position of the self-centering slides and consequently the position of the deflecting pins and pistons can be monitored and scanned by sensors.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
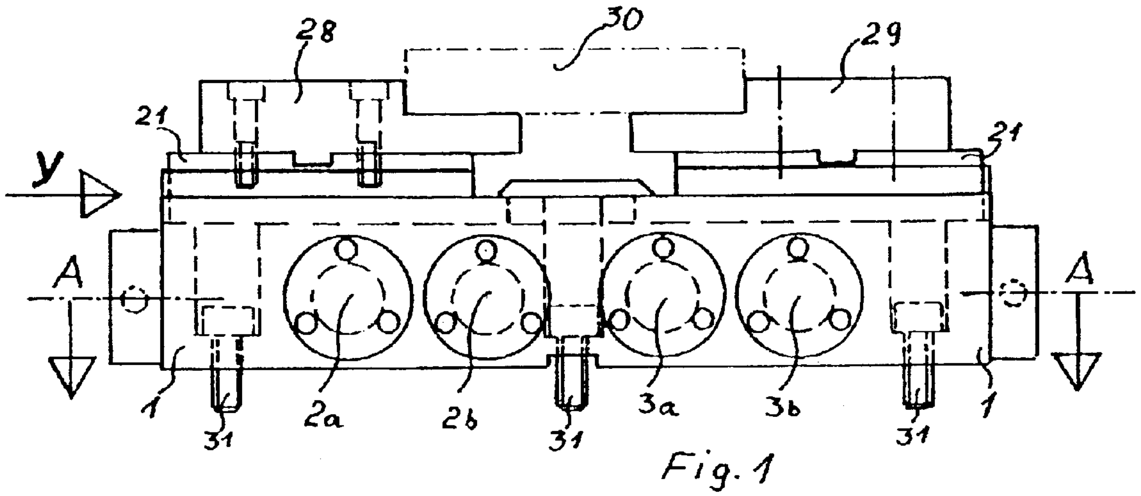
FIG. 1 is a front view of the unit.
Figure 2:
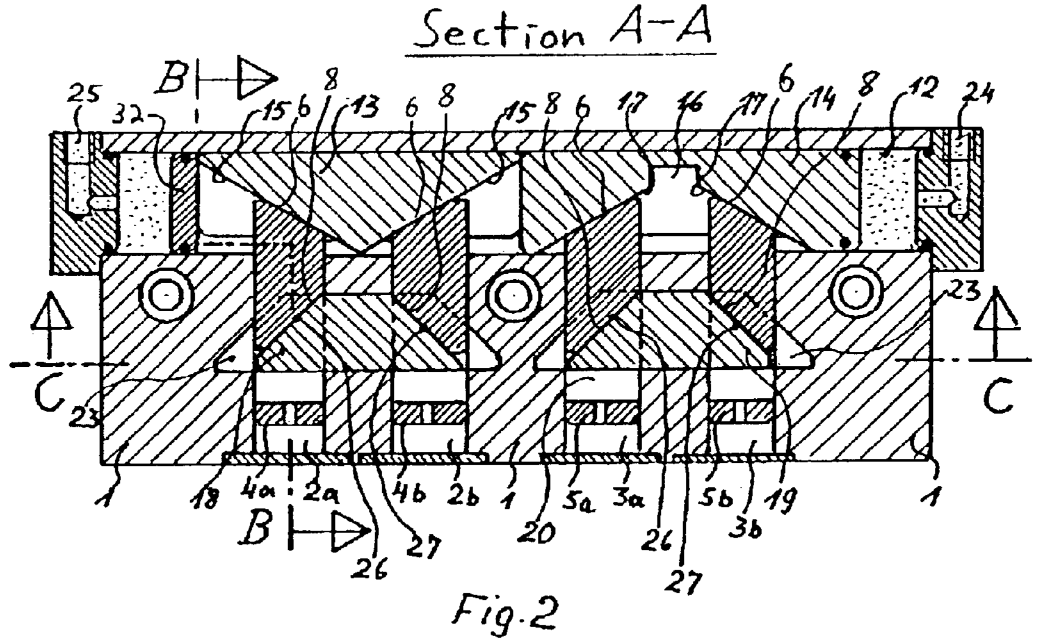
FIG. 2 is a horizontal section taken along line A—A through the unit.
Figure 3:
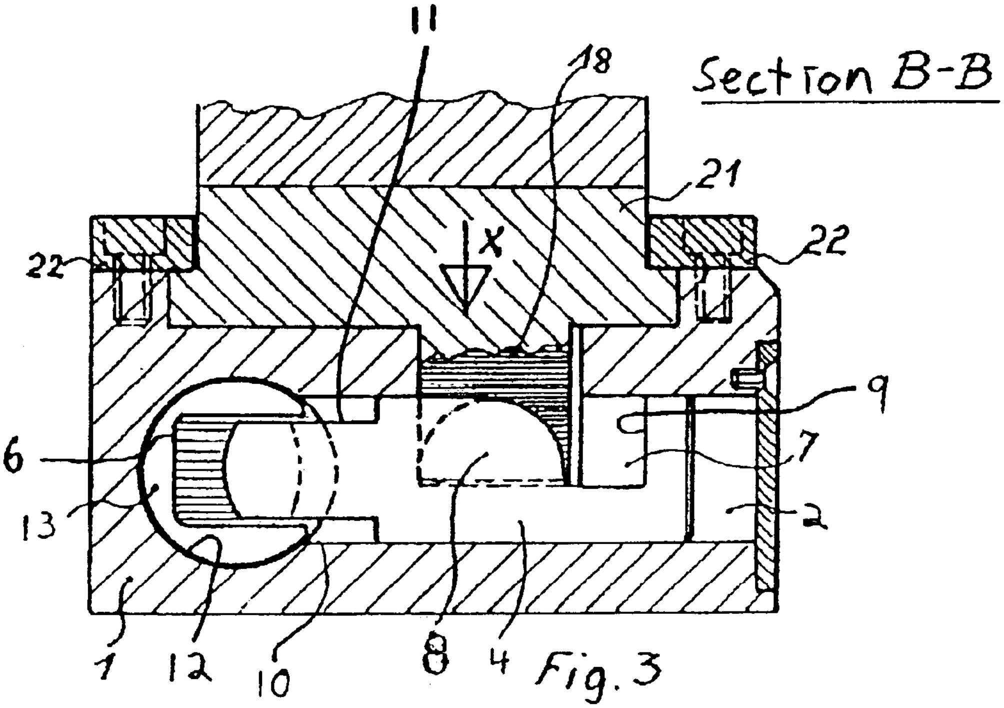
FIG. 3 is a cross taken along section B—B of the unit.
Figure 4:
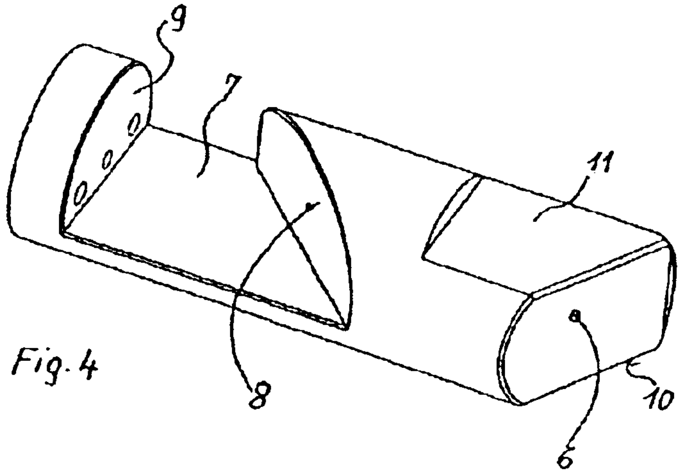
FIG. 4 is a perspective view of one embodiment of the deflecting pin.
Figure 5:
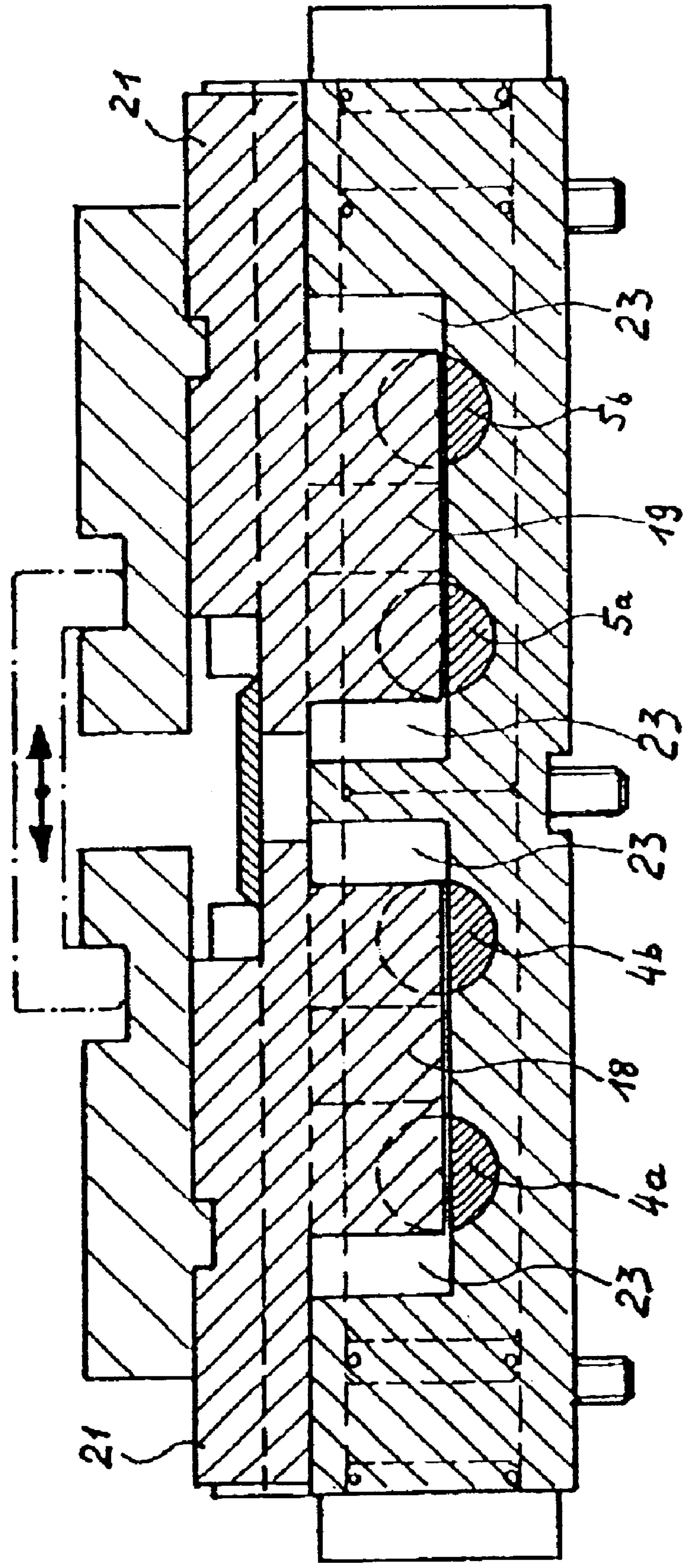
FIG. 5 is the longitudinal along section C—C through the unit.

Referring to the drawings in particular, the self-centering element comprises a housing 1, in which the entire mechanism is integrated. Horizontal recesses 2*a, b* and 3*a, b* are milled into the housing 1. Deflecting pins 4*a, b* and 5*a, b* are slidingly guided in these recesses. Each deflecting pin 4; 5 is provided at its head end with a wedge bevel 6 passing over the cross section. A groove 7, which has a straight limiting surface 9 toward the lower end and is limited with an oblique surface 8 on the other side, is recessed into the deflecting pin 4; 5 at the other end. The deflecting pin 4; 5 is provided with a flattened area 10 (see FIG. 4) on the underside and with a flattened area 11 on the opposite side in the head area. The deflecting pins 4; 5 are associated with the recesses in pairs and their wedge bevels 6 and their oblique surfaces 8 are correspondingly coordinated with one another.

A cylindrical hole 12, in which the recesses 2; 3 end, so that there is a connection between the recesses and the cylindrical hole, is provided in the housing 1 at right angles to the recesses 2; 3. Two pistons 13; 14 are introduced into the cylindrical hole 12. These pistons are provided with wedge surfaces 15; 17 over a partial area toward the center of the cylindrical hole. The wedge surfaces 15 extend in the piston 13 toward the recesses 2*a, b*, so that they are directed toward the recesses at an angle. The wedge surfaces 17 are provided in the piston 14, so that they are directed at an angle away from the recesses 3*a, b*, where they end in a groove 16.

A closely contacting connection is established between the wedge surfaces 15; 17 of the pistons 13; 14 and the deflecting pins 4*a, b* and 5*a, b* by the deflecting pins being introduced into the recesses 2*a, b* and 3*a, b* such that the wedge bevels 6 of the deflecting pins are slidingly in contact with the wedge surfaces 15; 17 of the pistons. The deflecting pins 4; 5 are inserted into the recesses 3; 4 in pairs such that their grooves 7 are directed toward the clamping side of the element. The housing 1 is provided with a recess 23 above the grooves 7 of each pair of deflecting pins 4; 5, so that an opening is formed in the upward direction. A carrier prism 18; 19 is inserted into the grooves 8 of each pair of deflecting pins. Each carrier prism 18; 19 is provided with oblique surfaces 26; 27, which are coordinated with the oblique surfaces 8 of the deflecting pins, so that they are slidingly guided on one another. The groove 7 in the deflecting pins is made so large that a free space 20 is left between the carrier prism 18; 19 and the limiting surface 9.

A self-centering slide 21 is associated with each carrier prism 18; 19, so that the carrier prism and the self-centering slide form one unit. The self-centering slides 21 are guided slidingly on the housing 1 and are limited laterally by guide strips 22. The carrier prisms 18; 19 perform a lateral movement, and the grooves 23 in the housing 1 are correspondingly designed such that there is a sufficiently large free space. This free space corresponds proportionally to the stroke of the pistons 13; 14 and to the movements of the other parts, which movements depend on it. The pistons 13; 14 are operated hydraulically via the hydraulic connections 24; 25. Clamping jaws 28; 29 are attached to the self-centering slides 21 in the manner of a detachable connection, so that the clamping jaws can be adapted to each application.

If pressure is admitted to the hydraulic connection 25, the pistons 13; 14 are moved to the right via a plunger 32. The wedge surfaces 15; 17 slide over the wedge bevels 6 of the deflecting pins 4; 5 and thus exert a pressure on each pair of deflecting pins 4 and 5. The deflecting pins pins 4 and 5 are thus displaced in opposite directions. The deflecting pins 4*b* and 5*a* are moving in the direction away from the piston and the deflecting pins 4*a* and 5*b* perform a movement of an equal amount in the opposite direction. This parallel displacement for the deflecting pins 4; 5 is brought about by the carrier prism 18; 19 associated with each pair of deflecting pins pins 4 and 5. The pressure acting on the deflecting pins 4*b* thus propagates via the oblique surface 8 of the groove 7 to the oblique surface 27 of the carrier prism 18. The surfaces slide on one another and the carrier prism 18 is moved to the left. The same process takes place at the deflecting pin 5*a*, so that the carrier prism 19 is displaced to the right. The self-centering slides connected to the carrier prisms follow this movement, the clamping element opens and a workpiece 30 can be inserted. If pressure is then admitted to the hydraulic connection 24, the pistons are displaced to the left, the deflecting pins 4 and 5 are moved in the other direction, and the carrier prisms 18 and 19 will thus move toward each other, and the workpiece is clamped.

Directing grooves are associated with the housing 1 on the underside, and the housing can be mounted on machine tables in a positioned manner by means of these directing grooves. The fastening screws 31 are used to fasten the self-centering element on the machine table.

Sensors, by means of which the position of the pistons or the position of the deflecting pins 4 and 5 and consequently also the position of the self-centering slides can be monitored and displayed, may be incorporated in the housing.

While a specific embodiment of the invention has been shown and described in detail to illustrate the application of the principles of the invention, it will be understood that the invention may be embodied otherwise without departing from such principles.

What is claimed is:

1. A self-centering workpiece clamping unit, comprising:

a first clamping jaw and a second clamping jaw;

a first centering slide connected to said first clamping jaw and a second centering slide connected to said second clamping jaw;

a housing;

pistons guided in a cylindrical hole formed in the housing, each of said pistons having a piston wedge surface;

a first pair of deflecting pins and a second pair of deflecting pins disposed in said housing, each of said deflecting pins being slidingly guided in a respective one of recesses formed in said housing in a plane located in parallel to a mounting surface of the unit, each of said deflecting pins being provided with wedge bevels at a head end that slide on a respective said piston wedge surface, said cylindrical hole extending in said plane and extending transversely to said recesses with displacement of the pairs of deflecting pins in opposite directions being brought about by the movement of the pistons; and carrier prisms, each of said carrier prisms being associated respectively to one of said slides and each respectively in contact with a surface of a pair of the deflecting pins and being displaced at right angles to a direction of movement of the deflecting pins and guided in a second plane located in parallel directly above the deflecting pins, the carrier prisms having wedge surfaces which bring about the transmission of forces to the self-centering slides.

2. A self-centering unit in accordance with claim 1, wherein the deflecting pins are provided over a partial area with a groove having a straight limiting surface toward an end of the deflecting pin, and said groove is limited by an oblique surface opposite said limiting surface.

3. A self-centering unit in accordance with claim 2, wherein each of said carrier prisms is provided with two bevels that can be respectively inserted into each of a pair of deflecting pins such that the bevels are in contact with the oblique surfaces of the deflecting pins and are guided slidingly.

4. A self-centering unit in accordance with claim 2, wherein each of said carrier prisms is connected to one of said self-centering slides.

5. A self-centering unit in accordance with claim 2, wherein said pistons are actuated hydraulically via hydraulic connections and a movement of said pistons displaces the deflecting pins in pairs and pins of each pair in opposite directions via said piston wedge surfaces and said wedge bevel of each of said deflecting pins, said carrier prisms being located in said groove of said deflecting pins and being moved by the deflecting pins toward an outside away from one another or toward the inside toward one another as a consequence of the displacement of the deflecting pins of each pair in opposite directions, so that the self-centering slides connected to the carrier prisms bring about the clamping operation.

6. A self-centering unit in accordance with claim 3, wherein each of said carrier prisms is connected to one of said self-centering slides.

7. A self-centering unit in accordance with claim 1, wherein each of said carrier prisms is connected to one of said self-centering slides.

8. A self-centering unit in accordance with claim 1, wherein said pistons are actuated hydraulically via hydraulic connections and a movement of said pistons displaces the deflecting pins in pairs and pins of each pair in opposite directions via said piston wedge surfaces and said wedge bevel of each of said deflecting pins, said carrier prisms being located in a groove of said deflecting pins and being moved by the deflecting pins toward an outside away from one another or toward the inside toward one another as a consequence of the displacement of the deflecting pins in one direction or annother, so that the self-centering slides connected to the carrier prisms bring about the clamping operation.

9. A self-centering unit in accordance with claim 1, further comprising sensors, wherein a position of the self-centering slides and consequently a position of the deflecting pins and pistons can be monitored and scanned by said sensors.

* * * * *